July 10, 1928.

C. S. HALL

AIRCRAFT

Original Filed Feb. 1, 1922

1,676,549

INVENTOR
Charles S. Hall
BY
Daniel N. Clark
ATTORNEYS

Patented July 10, 1928.

1,676,549

UNITED STATES PATENT OFFICE.

CHARLES S. HALL, OF LOS ANGELES, CALIFORNIA, ASSIGNOR TO HALL AIRWAYS CORPORATION, OF DOVER, DELAWARE, A CORPORATION.

AIRCRAFT.

Application filed February 1, 1922, Serial No. 533,466. Renewed November 28, 1927.

My invention relates to an improvement in aircraft and has for one of its objects to provide a wing by which the cambra of the lower surface and the curvature of the upper surface may be varied according to the atmospheric deflections and reactions exerted upon the surfaces of the said wing as the aircraft is propelled through the air.

Another object is to provide a means by which the angle of deflection in said wing may be automatically varied according to the reactionary air pressure induced by forward velocity of the aircraft through the air whereby the lifting effort of the said wing remains constant at various speeds of the said aeroplane while in flight.

Another object is to facilitate the take-off and the landing of the aircraft by providing a means whereby, as the relative forward velocity of the aircraft through the air is increased, the angle of incidence of the wing surfaces with respect to the line of flight, will be decreased, thus enabling the aircraft to take off at greatly reduced ground speed, and, inversely, to make a landing at reduced velocity, since, as the velocity is decreased, the angles of the wing surfaces with respect to the plane of flight are increased.

Another object is to construct a wing of aliform contour formed by a rigid forward portion to which a flexible rearward portion is attached, such rearward portion being supported by a cantalever spring, preferably of the leaf type, as shown, the said spring forming not only a supporting surface for such flexible portion, but also forming a continuity of the rib-like construction, the cantalever arrangement of the said spring, and all leaves thereof, being common to the rigid portion of the said wing, by which construction such type of wing is greatly simplified and its efficiency greatly increased under varying pressures and varying loads and, at the same time providing a structure embodying standard spring practice, thus rendering the construction both simple and less expensive as well as more desirable than other forms of flexible wing arrangements.

Having thus described the objects of my invention in its preferred form, I will now specify the same with reference to the accompanying drawings which form an essential part of this specification.

Figure 1:
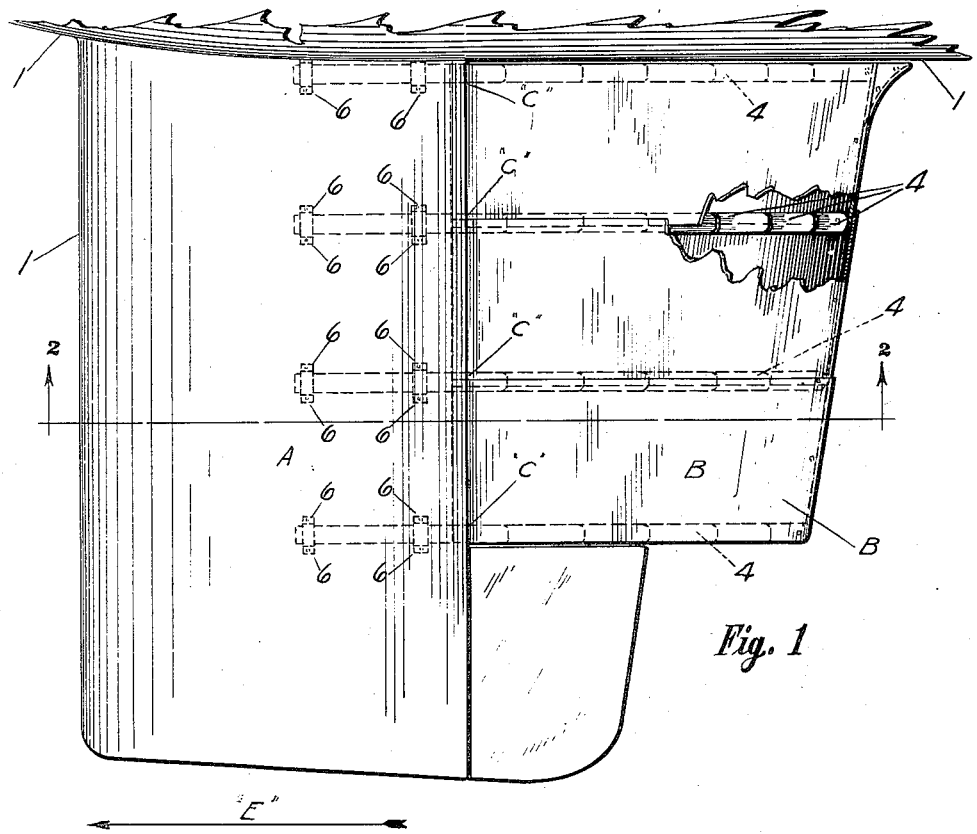
Figure 1, is a plan view of a wing showing a fragmented portion of the fusilage to which the same is attached.
Figure 2:
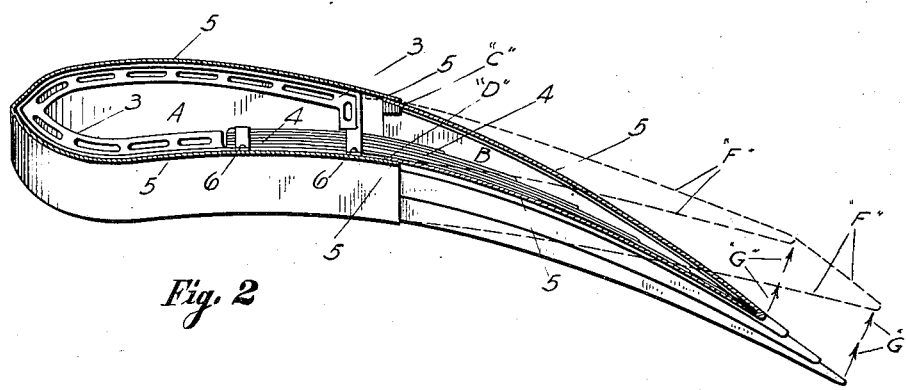
Figure 2, is a cross-sectional view of the same taken on line 2—2 as shown in Figure 1.

In carrying out my invention, the wing is attached to fusilage 1 by any suitable means. The said wing consists of two sections "A" and "B" as shown in Figure 1. Said wing is aliform, as shown in Figure 2 in cross-section, having a rib section 3 and a cantilever spring 4 rigidly held together in said rib and becoming a backward continuity thereof, the said rib and the said spring are attached to the wing covering 5 by means of suitable bolts 6, as shown in Figures 1 and 2. Said spring as shown has leaves of decreasing length, as the same is imbricated up from the base thereof contiguous to bolt 6 and covering 5 as shown in cross-section in Figure 2 and by dotted lines in plan view in Figure 1 and more particularly shown through the fragmented opening in wing covering 5 as shown in Figure 1. Covering 5 on the said wing section "B" is securely attached by any suitable means to section "A" at point "C" and extends backwardly and downwardly around the flexible end of the spring member 4, as shown in Figure 2, and finally ending at "D" in slidable contact with covering 5 over said section "A" of the said wing, as shown in Figure 2 in cross-section. Thus a flexible wing of aliform shape is provided, having a means by which the aliformity may be varied according to the reactionary air pressure above and below; a pressure produced by the relative velocity of the aeroplane through the air.

In operation, it will be seen as the aeroplane passes through the air, in the direction indicated by the arrow "E", the compression of deflection on the under surface of the said wing will increase in a fixed ratio as the relative velocity increases, and, as this compression increases, the spring member 4 will yield compensatorily and the feathered edge of the said wing will move upwardly towards the position shown by dotted lines "F" as indicated by arrows "G". As the yielding of the cantilever spring 4 will be augmented by the increased suction produced on the upper surfaces of the said wing by the reactionary atmospheric pressures, the aliformity of said wing will be varied according to the combined and relative reactions of the air induced on both the upper and lower surfaces thereof according to the relative velocity of the aircraft through the air.

Thus the wing maintains a lifting effect made constant according to the tension of spring 4. Moreover, the spring 4 yields according to the compression under and the suction over said wing and thus the action of said wing will automatically tend to maintain the equilibrium of the aircraft in the air.

It is understood that various changes may be made in the relative arrangement of parts, the shape and construction of the wing, ribs, and springs, without departing from the spirit of this invention.

Having thus described my invention, what I claim, and for which I desire to obtain Letters Patent, are as follows:

1. In an aircraft wing, the combination of; a forward body portion forming a part of the aliform contour thereof; a flexible trailing element forming a continuation and completion of the aliform contour, the forward margin of upper body element of the said trailing portion being rigidly attached to the rearward margin of the forward body portion, the lower forward margin of the said trailing element slidably held upon the upper, inner, surface of the rearward margin of the lower body element of the forward body portion; and a rib element arranged within the said aliform body portion by the said forward and the said rearward body portion, the said rib having a forward portion of rigid construction in conformity with the aliform contour of the said wing, the rearward portion of the said rib being formed by a leaf spring the same being arranged in cantalever position in the said forward portion, the leaves of the said spring being of receding lengths and of inverse proportion to their common cantalever position, the said spring forming a supporting element for the rearward and flexible portion of the said wing forming elements, substantially as shown.

2. In an aircraft wing, the combination of; a forward rigid portion and a rearward flexible portion, the said portions forming a wing of aliform contour; and a rib element arranged therein, the forward portion of the said rib element being of rigid construction while the rearward part of the said rib comprises a cantalever spring element, the said spring element forming a flexible continuation of the said rib and a supporting means for the body element of the said rearward flexible portion of the said wing, substantially as disclosed.

3. In an aircraft, a wing body element comprising in combination; a forward rigid portion and a rearward flexible portion, the said portions being attached together, the combined outer surfaces of which are of aliform contour, in cross-section; a rib forming element arranged in the forward rigid portion; and a cantalever spring rib forming element forming a flexible supporting means for the said flexible portion, the cantalever attachment of said spring being within the rigid portion, substantially as disclosed.

In testimony whereof, I have signed my name to this specification.

CHARLES S. HALL.